US012689971B2

(12) United States Patent     (10) Patent No.:   US 12,689,971 B2

Deshmukh et al.     (45) Date of Patent:     Jul. 21, 2026

(54) ADAPTIVE SELECTION OF COMMUNICATION INFRASTRUCTURE

(71) Applicant: T-Mobile USA, Inc., Bellevue, WA (US)

(72) Inventors: Amit Shantanu Deshmukh, Sammamish, WA (US); Kyeong Hun An, Sammamish, WA (US); Adrian Milner, Gardner, KS (US); Tanmay Roy, Redmond, WA (US); Nilesh Ranjan, Sammamish, WA (US); Mathew George, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 249 days.

(21) Appl. No.: 18/363,713

(22) Filed: Aug. 1, 2023

(65) Prior Publication Data

US 2025/0048207 A1     Feb. 6, 2025

Related U.S. Application Data

(60) Provisional application No. 63/516,735, filed on Jul. 31, 2023.

(51) Int. Cl.
    *H04W 36/00*     (2009.01)
    *H04W 4/60*     (2018.01)
    (Continued)

(52) U.S. Cl.
    CPC ............. *H04W 48/08* (2013.01); *H04W 4/60* (2018.02); *H04W 24/08* (2013.01); *H04W 36/0088* (2013.01); *H04W 84/042* (2013.01)

(58) Field of Classification Search
    CPC ... H04W 48/08; H04W 48/16; H04W 84/042; H04W 84/06; H04W 24/08; H04W 36/0088
    See application file for complete search history.

(56) References Cited

U.S. PATENT DOCUMENTS

| | | | |
|---|---|---|---|
| 6,801,772 B1 | 10/2004 | Townend et al. | |
| 7,489,930 B2 | 2/2009 | Aerrabotu et al. | |

(Continued)

FOREIGN PATENT DOCUMENTS

| | | |
|---|---|---|
| CA | 2790355 A1 | 3/2013 |
| CN | 101663905 A | 3/2010 |

(Continued)

OTHER PUBLICATIONS

International Search Report and Written Opinion from PCT App. No. PCT/US2024/040197 mailed Nov. 12, 2024, 12 pages.

*Primary Examiner* — Jamal Javaid
(74) *Attorney, Agent, or Firm* — Perkins Coie LLP

(57) ABSTRACT

Systems, methods, and devices that relate to adaptive selection of communication infrastructure are disclosed. In one example aspect, a method for wireless communication includes performing or receiving measurements of a serving cell and one or more neighboring cells based on a configuration from a base station. The method also includes comparing a first measurement result associated with a first channel condition of the serving cell and a second measurement result associated with a second channel condition of the one or more neighboring cells and adjusting an interval of time between two searches for an access network according to the comparing of the first measurement result and the second measurement result.

20 Claims, 9 Drawing Sheets

(51) Int. Cl.
    *H04W 24/08*     (2009.01)
    *H04W 48/08*     (2009.01)
    *H04W 84/04*     (2009.01)

(56)            References Cited

U.S. PATENT DOCUMENTS

| | | |
|---|---|---|
| 8,019,335 B2 | 9/2011 | Kallio |
| 8,108,002 B2 | 1/2012 | Lin |
| 8,170,616 B2 | 5/2012 | Lee |
| 8,175,620 B2 | 5/2012 | Carlson et al. |
| 8,175,621 B2 | 5/2012 | Hsu |
| 8,204,542 B2 | 6/2012 | Liao et al. |
| 8,260,291 B2 | 9/2012 | Wu |
| 8,312,337 B2 | 11/2012 | Park et al. |
| 8,380,205 B2 | 2/2013 | Hogan |
| 8,433,318 B2 | 4/2013 | Krishnamoorthy et al. |
| 8,532,652 B1 | 9/2013 | Edara |
| 8,553,563 B2 | 10/2013 | Suzuki et al. |
| 8,774,811 B2 | 7/2014 | Chou et al. |
| 8,831,608 B2 | 9/2014 | Zheng et al. |
| 9,047,648 B1 | 6/2015 | Lekutai et al. |
| 9,072,025 B2 | 6/2015 | Jen et al. |
| 9,313,643 B1 | 4/2016 | Ghoshal et al. |
| 9,877,213 B1 | 1/2018 | Wang et al. |
| 9,985,771 B2 | 5/2018 | Olufunmilola et al. |
| 10,172,060 B2 | 1/2019 | Raghunathan et al. |
| 10,244,501 B2 | 3/2019 | Miao et al. |
| 11,115,810 B1 | 9/2021 | Indurkar |
| 11,418,958 B1 | 8/2022 | Siryy et al. |
| 2008/0220784 A1 | 9/2008 | Somasundaram et al. |
| 2012/0320879 A1 | 12/2012 | Martin et al. |
| 2014/0242993 A1 | 8/2014 | Dahlen et al. |
| 2014/0286219 A1 | 9/2014 | Siomina et al. |
| 2018/0063765 A1 | 3/2018 | Bansal et al. |
| 2018/0160362 A1 | 6/2018 | Raghunathan et al. |
| 2018/0220329 A1 | 8/2018 | Arumugam et al. |
| 2018/0269962 A1 | 9/2018 | Liu et al. |
| 2019/0126775 A1 | 5/2019 | Han et al. |
| 2019/0159116 A1 | 5/2019 | Guan et al. |
| 2021/0037403 A1 | 2/2021 | Kim et al. |
| 2021/0321316 A1* | 10/2021 | Shen ..................... H04W 48/18 |
| 2022/0252736 A1 | 8/2022 | Fu |
| 2022/0303755 A1 | 9/2022 | Karakkad et al. |
| 2022/0400418 A1 | 12/2022 | Kim et al. |
| 2023/0232263 A1* | 7/2023 | Wu ................. H04W 36/00837 370/329 |
| 2023/0396977 A1 | 12/2023 | Akdim et al. |
| 2024/0214888 A1 | 6/2024 | Li et al. |

FOREIGN PATENT DOCUMENTS

| | | |
|---|---|---|
| CN | 102461254 B | 9/2015 |
| CN | 110710262 B | 5/2022 |
| EP | 3846544 A1 | 7/2021 |
| WO | 2022/027559 A1 | 2/2022 |

\* cited by examiner

ADAPTIVE SELECTION OF COMMUNICATION INFRASTRUCTURE

CROSS-REFERENCE TO RELATED APPLICATIONS

This application claims the benefit of U.S. Provisional Patent Application No. 63/516,735, filed on Jul. 31, 2023, entitled ADAPTIVE SELECTION OF COMMUNICA-TION INFRASTRUCTURE, which is hereby incorporated by reference in its entirety.

BACKGROUND

In telecommunication, a Public Land Mobile Network (PLMN) refers to a mobile operator's cellular network in a specific country. Several cellular access technologies can be provided in a PLMN, such as Global System for Mobile Communication (GSM) access technology, Universal Mobile Telecommunication System (UMTS) access tech-nology, Long-Term Evolution (LTE) access technology, and New Radio (NR) access technology. Network operators also adopt satellite-based access technology with the advance-ment in wireless technology.

BRIEF DESCRIPTION OF THE DRAWINGS

Detailed descriptions of implementations of the present invention will be described and explained through the use of the accompanying drawings.

Figure 1:
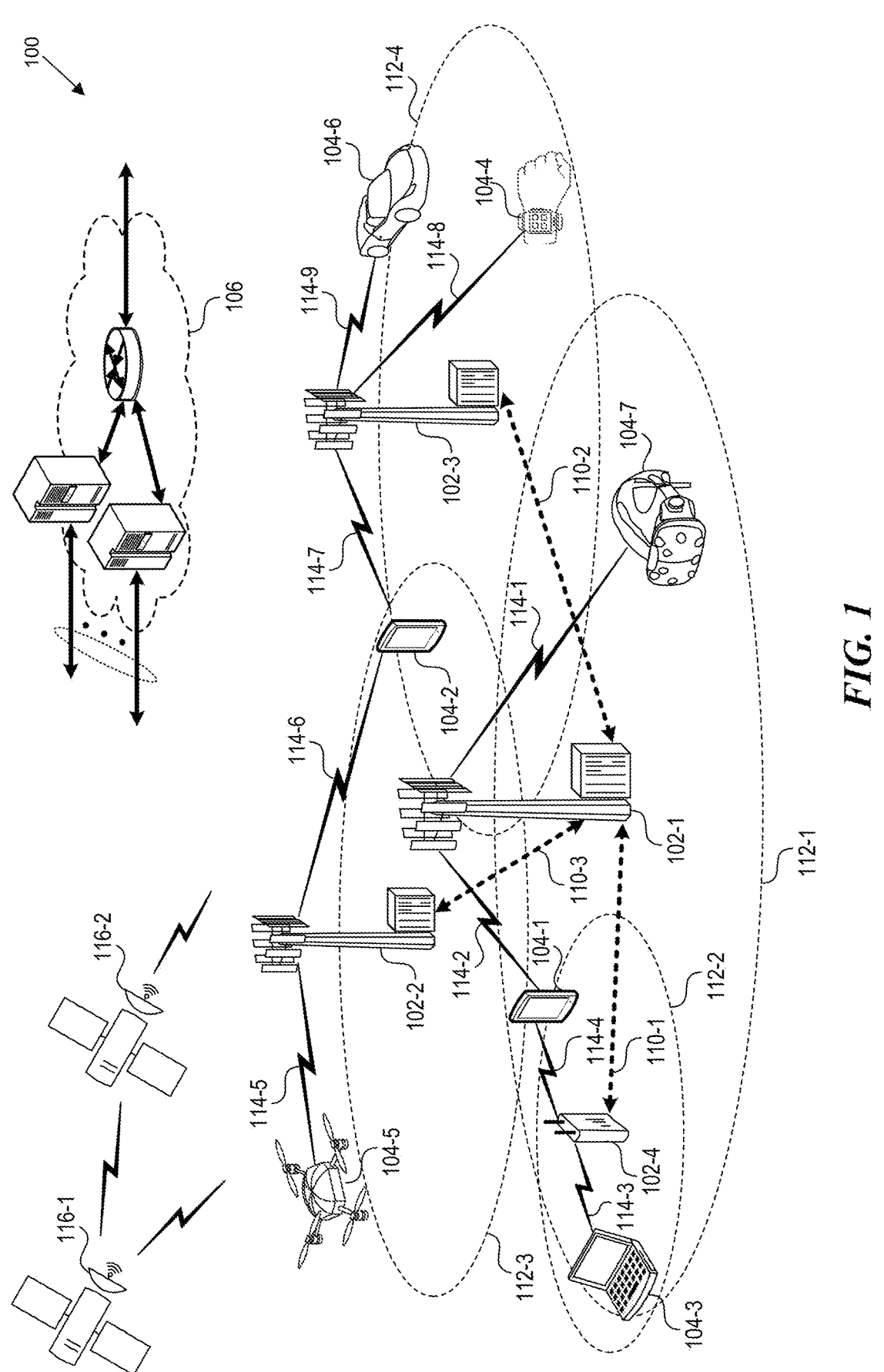
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

To fully realize ubiquitous connectivity for large numbers of devices globally in the 5G era, an integrated network in which satellites play an increasing role alongside terrestrial networks is needed. The selection of the proper type of communication infrastructure to reduce latency, support higher throughput, and conserve user equipment (UE) bat-tery can be challenging given the different characteristics of satellites and terrestrial networks, particularly during the interim before satellite deployment gains momentum.

This patent document discloses techniques that can be implemented in various embodiments to enable the adaptive selection between terrestrial networks and satellite networks based on network deployment configurations. In particular, using the disclosed techniques, a multiplier coefficient can be adapted to adjust the interval of searching for a higher priority public land mobile network (HPPLMN). By modi-fying the multiplier based on quality metrics from a UE, preference to a specific type of communication infrastruc-ture (e.g., either terrestrial or satellite) based on network conditions can be achieved.

The description and associated drawings are illustrative examples and are not to be construed as limiting. This disclosure provides certain details for a thorough under-standing and enabling description of these examples. One skilled in the relevant technology will understand, however, that the invention can be practiced without many of these details. Likewise, one skilled in the relevant technology will understand that the invention can include well-known struc-tures or features that are not shown or described in detail, to avoid unnecessarily obscuring the descriptions of examples.

Wireless Communications System

FIG. 1 is a block diagram that illustrates a wireless telecommunications network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Insti-tute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wire-less devices 104-1 through 104-7 can correspond to or include network 100 entities capable of communication using various connectivity standards. For example, a 5G communication channel can use millimeter wave (mmW) access frequencies of 28 GHz or more. In some implemen-tations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G New Radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service requirements and multi-terabits-per-second data transmission in the era of 6G and beyond, such as terabit-persecond backhaul systems, ultrahigh-definition content streaming among mobile devices, AR/VR, and wireless high-bandwidth secure communications. In another example of 6G, the network 100 can implement a converged Radio Access Network (RAN) and core architecture to achieve Control and User Plane Separation (CUPS) and achieve extremely low user plane latency. In yet another example of 6G, the network 100 can implement a converged Wi-Fi and core architecture to increase and improve indoor coverage.

5G Core Network Functions

Figure 2:
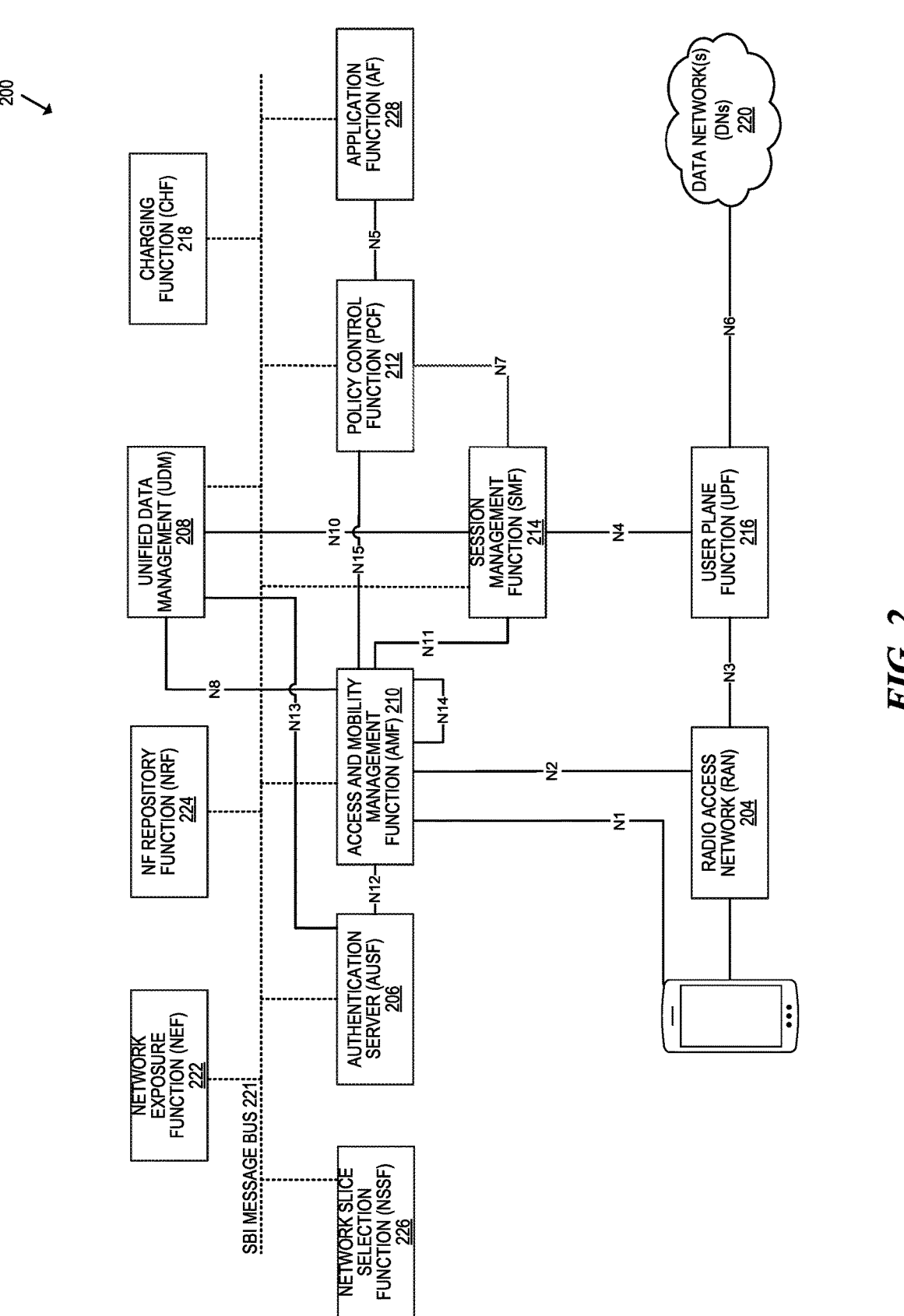
FIG. 2 is a block diagram that illustrates 5G core network functions (NFs) that can implement aspects of the present technology.

FIG. 2 is a block diagram that illustrates an architecture 200, including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane, and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP) (not shown in FIG. 2).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under Third-Generation Partnership Project (3GPP) TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Channel Condition-Based Public Land Mobile Network (PLMN) Searching

Figure 3:
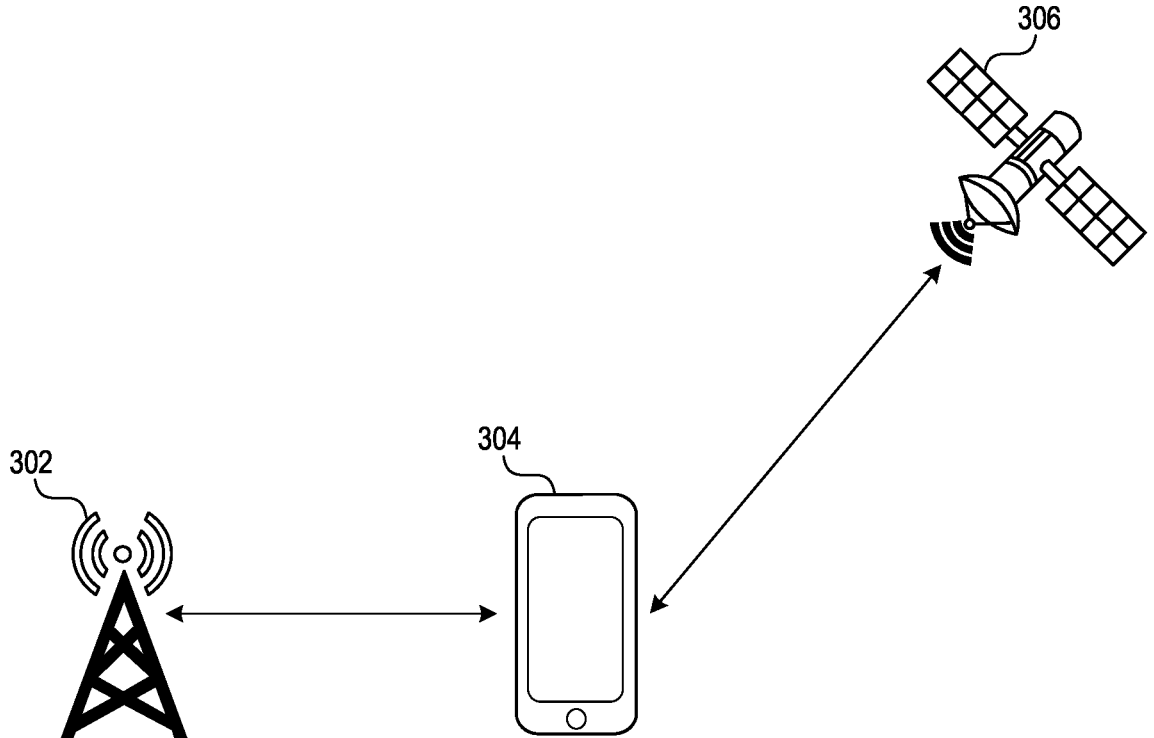
FIG. 3 is a schematic diagram illustrating an example configuration of a terrestrial access node and a satellite-based access node in accordance with one or more embodi-ments of the present technology.

In 5G communication systems, access to a PLMN can be facilitated by terrestrial access nodes, such as macro cells or micro cells, as well as satellite-based access nodes. FIG. 3 is a schematic diagram illustrating an example configuration of a terrestrial access node and a satellite-based access node in accordance with one or more embodiments of the present technology. In terrestrial access technology, the antennas for the cell sites 302 are mounted on ground-based masts, rooftops, and other existing structures, at a height that provides a clear view over the surrounding buildings and terrain. A macro cell is a cell in a mobile phone network that provides radio coverage served by a high-power cell site, while a micro cell is a cell in the mobile phone network that provides a lower-power cell site. In satellite-based access technology, a satellite link 306 is defined as a radio link between a transmitting earth station and a receiving earth station through one satellite. Satellite Internet access, or satellite broadband, is Internet access provided through communication satellites. Modern consumer-grade satellite Internet service is typically provided to individual users through geostationary satellites that can offer relatively high data speeds, with newer satellites able to achieve downstream data speeds up to 506 Mbit/s. In addition, new satellite Internet constellations are being developed in low-earth orbit to enable low-latency Internet access from space.

Satellite-based RANs can provide many benefits including expansive coverage capabilities, faster deployment, and mobile entity connectivity. These networks have the potential to deliver connectivity to remote areas where traditional terrestrial networks may not reach. Satellite RANs can also be deployed faster than terrestrial RANs. They can also provide connectivity for mobile entities like ships or cars. However, while satellite networks can offer certain advantages, terrestrial RANs often provide more optimal solutions for many scenarios. For example, terrestrial RANs still offer lower latency because of the shorter distances the radio signals have to travel. Furthermore, terrestrial networks can support higher data rates. Therefore, terrestrial RANs are often preferred to provide UEs, such as UE 304, with better user experience in the form of lower latency, higher data rates, and increased reliability. Furthermore, when a UE is connected to a terrestrial RAN and searches for other RANs, many of which can be satellite RANs in rural areas, the UE consumes energy, leading to faster battery depletion. Typically, the connection condition is better when connected to a terrestrial RAN as compared to a satellite-based RAN. Therefore, to optimize battery life as well as network quality on the UE, it is desirable to prioritize PLMN searching to a terrestrial RAN, particularly during the interim when satellite access technology is outperformed by terrestrial access technology.

Currently, the 3GPP standard specifies a Multiplier Coefficient for Higher Priority PLMN, $EF_{MCHPPLMN}$, that can be configured and used together with the timer interval configured in $EF_{HPPLMN}$ to adjust the interval of time between two searches for higher priority PLMN via Next Generation RAN (NG-RAN) satellite access. Specifically, $EF_{HPPLMN}$ specifies the time interval between two searches, and $EF_{MCHPPLMN}$ specifies a multiplier coefficient to be used together with the timer interval configured in $EF_{HPPLMN}$ to adjust the interval of time between two searches for an alternative PLMN via NG-RAN satellite access. For UEs supporting satellite NG-RAN access as specified in the 3GPP standard, the multiplier coefficient is coded as an unsigned byte, ranging from 1 to a maximum value of 255. If $EF_{MCHPPLMN}$ is configured, the time interval between two searches for a higher priority PLMN is calculated by multiplying the time interval configured in $EF_{HPPLMN}$ and the multiplier coefficient configured in $EF_{MCHPPLMN}$. However, the existing techniques as defined by the 3GPP standard do not take into account the channel conditions of the current cell and the neighboring cells to dynamically adapt the multiplier coefficient or the time interval. Accordingly, existing systems may allow an interval of time between two PLMN searches at a rate that quickly depletes battery life on the UE or causes a ping-pong type of cell reselection behavior, leading to degraded network performance and user experience.

Techniques are disclosed herein to improve communication efficiency and preserve UEs' battery life by prioritizing certain types of access nodes, e.g., terrestrial RANs as compared to satellite-based RANs. For example, the UE or the network can prioritize a terrestrial RAN over any satellite RANs and only chooses to attach to a satellite RAN as a last resort in the absence of a terrestrial RAN option (e.g., a macro cell). As another example, the UE or the network can update a time interval for searching for an access network based on the channel conditions and/or attributes associated with the access networks.

As one example, methods and systems are described herein for prioritizing terrestrial RANs (e.g., macro cells) over satellite-based RANs by dynamically updating the multiplier coefficient configured in $EF_{MCHPPLMN}$. The updating of the multiplier coefficient can be determined based on the comparison between the serving cell performance and the performance of a neighbor cell. By adjusting the multiplier coefficient configured in $EF_{MCHPPLMN}$, the time interval between two searches for a higher priority PLMN changes, leading to different time durations for cell reselection searches, which can in turn help conserve UE power and reduce a ping-pong type of reselection behavior.

Dynamically updating the multiplier coefficient configured in $EF_{MCHPPLMN}$ faces several technical challenges, such as how to ensure that the serving cell is at least as good as, or better than, the neighboring cell and how to avoid unnecessary searches for a higher priority PLMN via NG-RAN satellite access. To overcome these technical difficulties in updating the multiplier coefficient configured in $EF_{MCHPPLMN}$, methods and systems are disclosed herein to perform comparisons between quality metrics of the serving cell and the neighbor cell and to adjust the multiplier coefficient configured in $EF_{MCHPPLMN}$ to optimize battery life on UEs and reduce ping-pong cell reselection behaviors.

Figure 4:
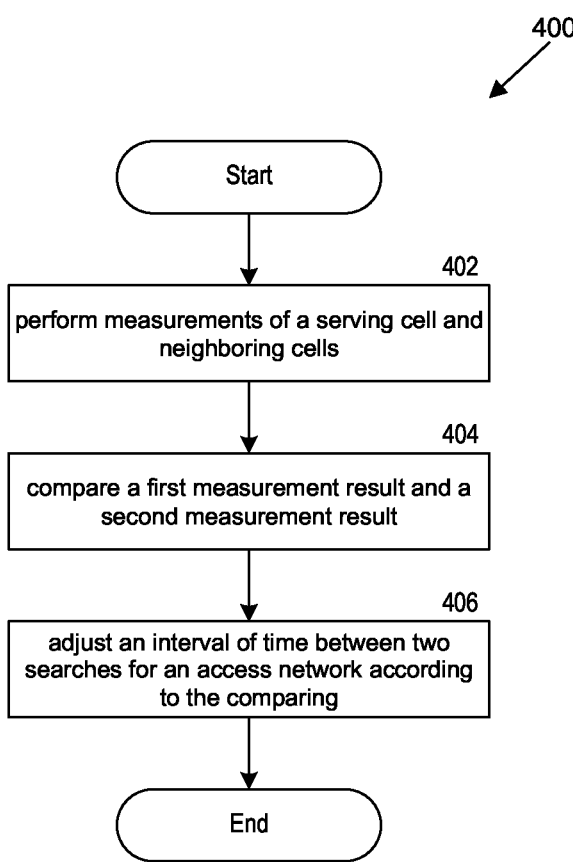
FIG. 4 is a flowchart representation of a process for wireless communication in accordance with one or more embodiments of the present technology.

FIG. 4 is a flowchart representation of a process for wireless communication in accordance with one or more embodiments of the present technology. The process 400 includes, at operation 402, performing measurements of a serving cell and neighboring cells. The measurements of a serving cell and one or more neighboring cells are based on a configuration from a base station and can be performed by a wireless mobile device (e.g., UE 304 shown in FIG. 3). The process 400 includes, at operation 404, comparing a first measurement result and a second measurement result. The comparing of the first measurement result and the second measurement result can be performed by the wireless mobile device. Furthermore, the first measurement result can be associated with a first channel condition of the serving cell, such as Received Signal Strength Indicator (RSSI), Received Signal Strength Quality (RSSQ), Reference Signal Received Power (RSRP), or Signal to Interference plus Noise Ratio (SINR). The second measurement result can be associated with a second channel condition of one or more neighboring cells (e.g., RSSI, RSSQ, RSRP, or SINR). The process 400 includes, at operation 406, adjusting an interval of time between two searches for an access network according to the comparison of the first measurement result and the second measurement result. The adjustment of the interval of time between two searches for an access network can be informed by the comparison and stored on the SIM card in a UE.

In some embodiments, the process includes selectively adjusting, by the wireless mobile device, a multiplier coefficient associated with a PLMN search. The multiplier coefficient can be modified by updating a SIM applet on the wireless mobile device. In some embodiments, the SIM applet is stored in memory and runs on a physical SIM card or an embedded SIM card. The multiplier coefficient can be denoted as $EF_{MCHPPLMN}$. For example, $EF_{MCHPPLMN}$ can be an unsigned byte with a range from 1 to a maximum value of 255. The multiplier coefficient can be used to adjust the time interval for a higher priority PLMN search (e.g., a high value for the multiplier coefficient indicates more time between higher priority PLMN searches). The multiplier can be accessible when at least one of a plurality of services on a SIM card is enabled (e.g., service n° 144, support for Multiplier Coefficient for Higher Priority PLMN search via NG-RAN satellite access) and at least one of the plurality of services on the SIM card can represent one or more alterable variables (e.g., $EF_{MCHPPLMN}$). The selectively adjusted multiplier can be used in prioritizing a terrestrial access network or a satellite-based access network based on the measurements of the serving cell and one or more neighboring cells.

In some embodiments, the process includes determining, by the wireless mobile device, a third and fourth measurement result. For example, the first measurement result can be equal to or lower than the second measurement result, which indicates that the second measurement result associated with the second channel condition of one or more neighboring cells will likely provide better network experience than the serving cell. The system can compare a third measurement result associated with the first channel condition of the serving cell and a fourth measurement result associated with the second channel condition of at least one of the one or more neighboring cells. The third measurement result and the fourth measurement result can represent channel conditions distinct from the channel conditions represented by the first measurement result and the second measurement result. For example, the first and second measurement results can be RSSI values, and the third and fourth measurement results can be RSSQ values. By using multiple channel conditions for the measurement, the system can improve the confidence of the present network experience at the UE.

In some embodiments, the process includes comparing, by the wireless device, the first and second measurement results. If the first measurement result is less than the second measurement result, the system can decrease the interval of time between two searches for an access network by selectively adjusting the multiplier coefficient (e.g., $EF_{MCHPPLMN}$). Alternatively, if the first measurement result is greater than the second measurement result, the system can increase the interval of time between two searches for an access network.

The system can measure quality metrics from both the service sector and the neighboring sector including quality metrics for LTE and 5G applications. For example, the system can measure RSRP and RSRQ in LTE applications. The system can measure Secondary Synchronization RSRP (SS-RSRP) and Secondary Synchronization RSRQ (SS-RSRQ) in 5G applications. The system can differentiate between the quality metrics for the serving cell and the neighbor cell. Differentiating between the quality metrics is important when determining whether to hop between cells.

Figure 5:
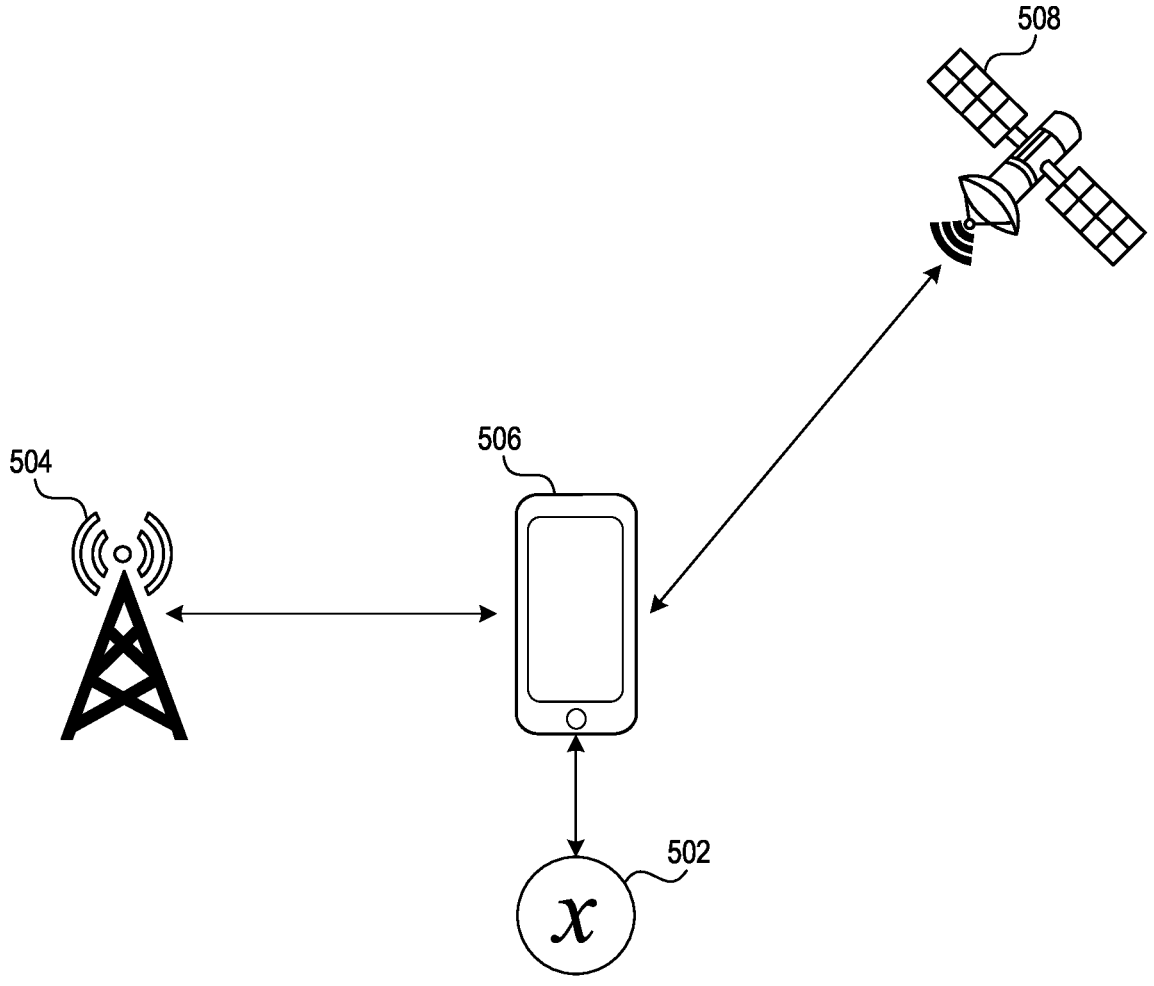
FIG. 5 is a schematic diagram illustrating an example configuration of a Subscriber Identity Module (SIM) applet implementation in accordance with one or more embodi-ments of the present technology.

In some implementations, the system can use a SIM applet to determine a priority of terrestrial RANs (e.g., macro cells) and satellite RANs. The SIM applet can be implemented to include a computational model to continually monitor quality metrics measured at the UE (e.g., SS-RSRP, SS-RSRQ, and other metrics that can determine channel condition) and to determine when to update the coefficient configured in $EF_{MCHPPLMN}$. FIG. 5 is a schematic diagram illustrating an example configuration of a SIM applet implementation in accordance with one or more embodiments of the present technology. FIG. 5 includes cell sites 504, UE 506, and satellite link 508. UE 506 can perform measurements of a serving cell (e.g., cell sites 504) and one or more neighboring cells (e.g., satellite link 508) based on a configuration from a base station. UE 506 can provide measurement results, such as a first measurement result associated with a first channel condition of the serving cell (e.g., cell sites 504) and a second measurement result associated with a second channel condition of the one or more neighboring cells (e.g., satellite link 508). The SIM applet deployed on UE 506 can compare the first measurement result with the second measurement result, and selectively adjust an interval of time between two searches for an access network (e.g., coefficient 502) according to the comparison of the first measurement result and the second measurement result.

For example, after UE 506 compares the measurement result associated with satellite link 508 (e.g., the first measurement result) to the measurement result associated with cell sites 504 (e.g., the second measurement result), UE 506 determines that the channel condition of satellite link 508 is better than cell sites 504. UE 506 can switch to satellite link 508 but decides to reduce the value of coefficient 502, thereby shortening the cell search period so as to increase the chances of quickly finding a terrestrial RAN that has a better channel condition than satellite link 508.

As another example, if the channel condition associated with satellite link 508 is worse than cell sites 504, UE 506 can stay connected to the terrestrial cell and maintain/increase coefficient 502 to limit searching for a higher priority PLMN, subsequently preserving the battery life of UE 506.

Sometimes, however, the SIM applet can be overwhelmed with local requests and transactions. It is thus helpful to offload the processing to a network node (e.g., an applet server). The use of a network node to perform the adjustment of the search durations allows easier updates based on different deployment configurations of the networks.

Figure 6:
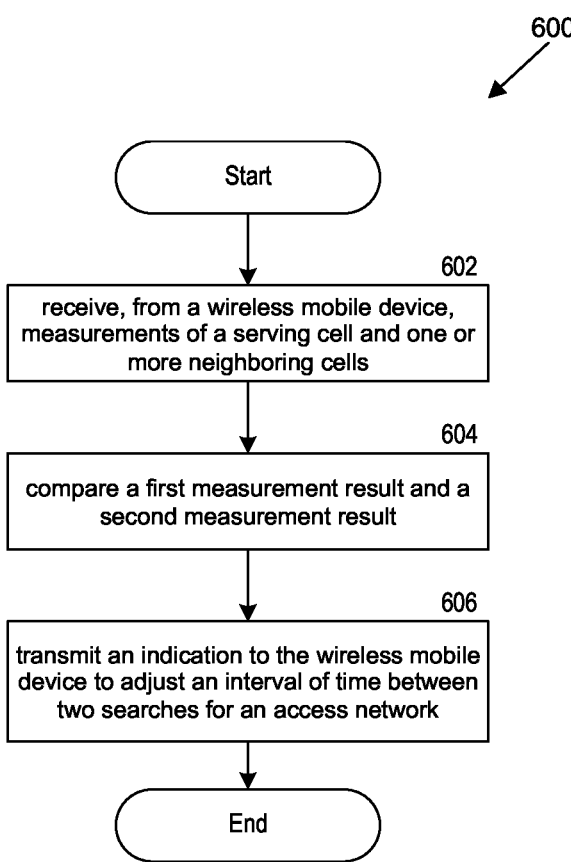
FIG. 6 is a flowchart representation of another process for wireless communication in accordance with one or more embodiments of the present technology.

FIG. 6 is a flowchart representation of another process for wireless communication in accordance with one or more embodiments of the present technology. The process 600 includes, at operation 602, receiving, from a wireless mobile device, measurements of a serving cell and neighboring cells. The measurements of a serving cell and one or more neighboring cells based on a configuration from a base station can be performed by a wireless mobile device (e.g., UE 304 shown in FIG. 3) and transmitted to the network server. The process 600 includes, at operation 604, comparing a first measurement result and a second measurement result. The comparing of the first measurement result and the second measurement result can be performed at the network server. Furthermore, the first measurement result can be associated with a first channel condition of the serving cell (e.g., RSSI, RSSQ, RSRP, or SINR). The second measurement result can be associated with a second channel condition of one or more neighboring cells (e.g., RSSI, RSSQ, RSRP, or SINR). The process 600 includes, at operation 606, transmitting an indication to the wireless mobile device to adjust an interval of time between two searches for an access network. The adjustment of the interval of time between two searches for an access network can be informed by the comparison.

In some embodiments, the applet on the UE takes measurements of the serving cell and the neighbor cell using the SIM applet and the toolkit application programming interface (API). For example, if the measurements (e.g., RSSI or RSSQ) meet the threshold, the SIM applet can treat the measurement as an event and transmit the event to a network server. This allows the SIM applet to identify scenarios in which changing the serving cell is beneficial, and thus the system can preserve battery life and improve network quality on the UE.

In some embodiments, the process includes receiving a notification from the wireless mobile device at the network server. The notification can be generated on the wireless mobile device. In some embodiments, the notification includes both the first measurement result and the second measurement result. The first measurement result and the second measurement result can be used to determine the measurements of the serving cell and the one or more neighboring cells of the wireless mobile device.

In some embodiments, the network server can include a first communication platform that communicates with a second network server. Alternatively, the network server can include two communication platforms. In some embodiments, the first communication platform is a SIM applet platform responsible for computations and comprises a process model (e.g., a state machine). The second communication platform can include a SIM server platform. Both communication platforms can be included on the same network server.

In some embodiments, the first communication platform including the process model generates an update by comparing, upon determining that the first measurement result is equal to or lower than the second measurement result, a third measurement result to a fourth measurement result. Both the third and fourth measurement results can be received from the wireless mobile device. In some embodiments, the third measurement result is associated with the first channel condition of the serving cell and the fourth measurement result is associated with the second channel condition of at least one or more neighboring cells. In some embodiments, the second network server receives the update from the first communication platform of the network server. The wireless mobile device can download the update from the first communication platform of the network server. The update from the first communication platform of the network server can include modifications to optimize the interval of time between two searches for an access network based on the first measurement result being less than the second measurement result. The update comprises a multiplier coefficient associated with a PLMN search. The multiplier coefficient can be denoted as $EF_{MCHPPLMN}$.

In some embodiments, the system uses a SIM server platform (e.g., an applet server) to perform the same functions as the SIM applet. The SIM server platform can contain the model that monitors quality metrics and may send updates to a SIM server platform, as deemed necessary by the model. In some embodiments, the SIM server platform is a SIM over-the-air (OTA) server used to push the updates to the UE.

Figure 7:
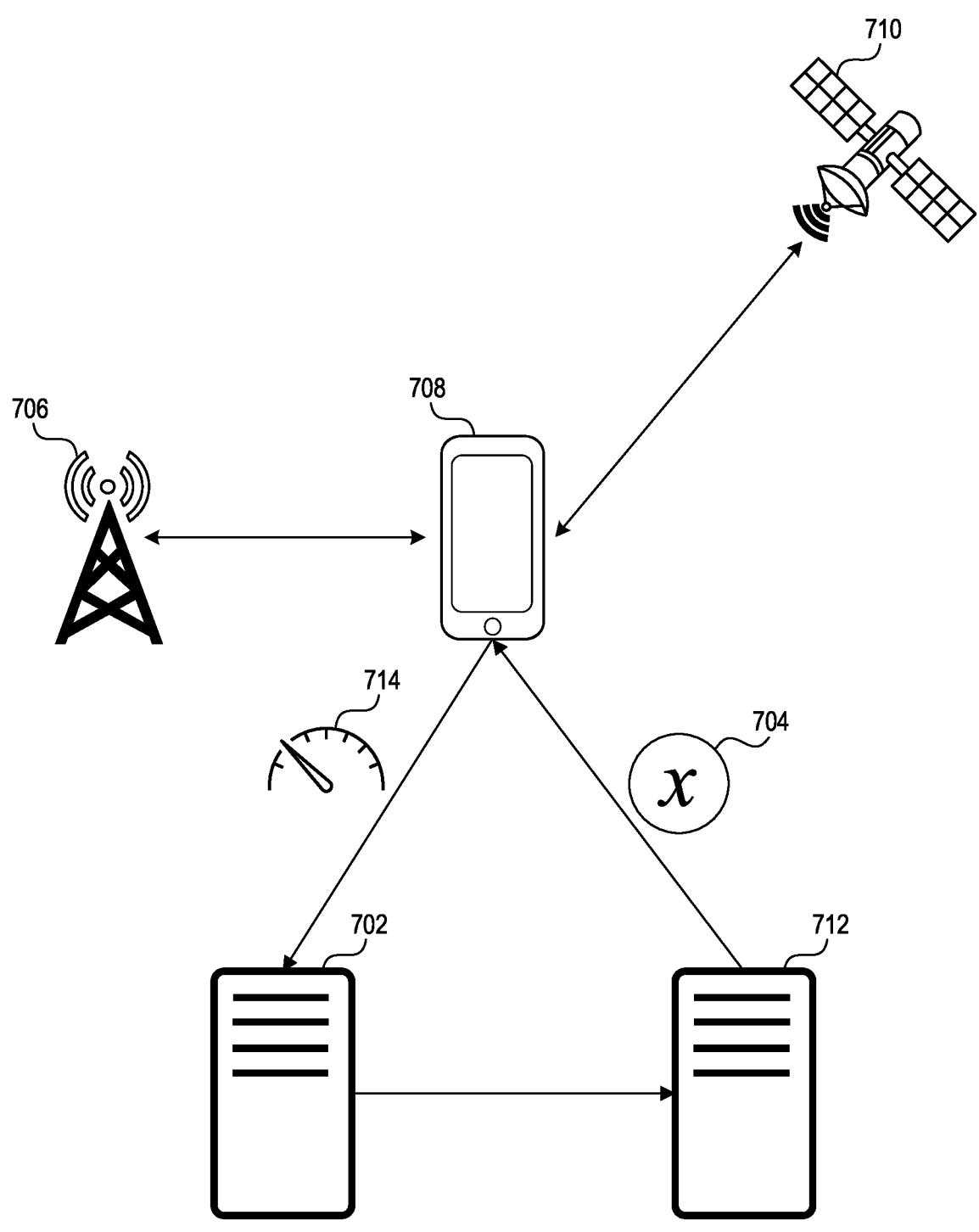
FIG. 7 is a schematic diagram illustrating another example configuration of a server implementation in accor-dance with one or more embodiments of the present tech-nology.

FIG. 7 is a schematic diagram illustrating another example configuration of a server implementation in accordance with one or more embodiments of the present technology. FIG. 7 includes network server 702 to give higher priority to terrestrial RANs (e.g., macro cells) than satellite RANs by transmitting an indication to the wireless mobile device to adjust the multiplier coefficient configured in $EF_{MCHPPLMN}$. Network server 702 can be a SIM applet server. Network server 702 can include the SIM applet server as well as SIM OTA server 712, or, alternatively, the servers can be separate. Network server 702 can receive, from a wireless mobile device, quality metrics such as measurements 714 (e.g., SS-RSRP, SS-RSRQ, and other metrics that can determine channel condition) measured at the UE, to determine when to update the coefficient configured in $EF_{MCHPPLMN}$ (e.g., using update 704). FIG. 7 includes cell sites 706, UE 708, and satellite link 710. UE 708 can transmit measurements of a serving cell (e.g., measurements 714 of cell sites 706) and one or more neighboring cells (e.g., measurements 714 of satellite link 710) based on a configuration from a base station to network server 702.

UE 708 can expose a toolkit API that includes a SIM applet. The SIM applet can establish secure communications to network server 702. The SIM applet can use the toolkit API to periodically retrieve measurements (e.g., measurements 714) related to channel conditions of a serving cell and one or more neighbor cells. Measurements 714 can be transmitted to network server 702 by a SIM applet that requests data via the UE toolkit API.

Network server 702 can compare a first measurement result associated with a first channel condition of the serving cell (e.g., cell sites 706) and a second measurement result associated with a second channel condition of the one or more neighboring cells (e.g., satellite link 710). Network server 702 can compare the measurement results and transmit an indication to UE 708 to adjust an interval of time between two searches for an access network (e.g., update 704) according to the comparison of the first measurement result and the second measurement result.

For example, after network server 702 compares the measurement result associated with satellite link 710 (e.g., the first measurement result) to the measurement result associated with cell sites 706 (e.g., the second measurement result), network server 702 can determine that the channel condition of satellite link 710 is better than cell sites 706, and that UE 708 is connected to cell sites 706. Network server 702 can transmit an indication to UE 708 to switch to satellite link 710 and decrease the coefficient associated with update 704 to increase the chances that UE 708 can find a terrestrial RAN that has a better channel condition than satellite link 710.

Network server 702 can include a SIM server platform that includes processing steps to determine whether the channel condition associated with satellite link 710 is worse than cell sites 706 and whether UE 708 is connected to cell sites 706. Network server 702 can transmit an indication to UE 708 to stay connected to 706 and maintain or reduce the coefficient associated with update 704 to limit searching for a higher priority PLMN, subsequently preserving the battery life of UE 708.

Sometimes, however, the SIM applet can be overwhelmed with requests and transactions from other applets. In this scenario, it is helpful to offload the processing to an applet server. Furthermore, using an applet server can allow for an easier method of updating the multiplier coefficient as updates are coordinated and pushed from the applet server that can be more reliable than the SIM applet.

Figure 8:
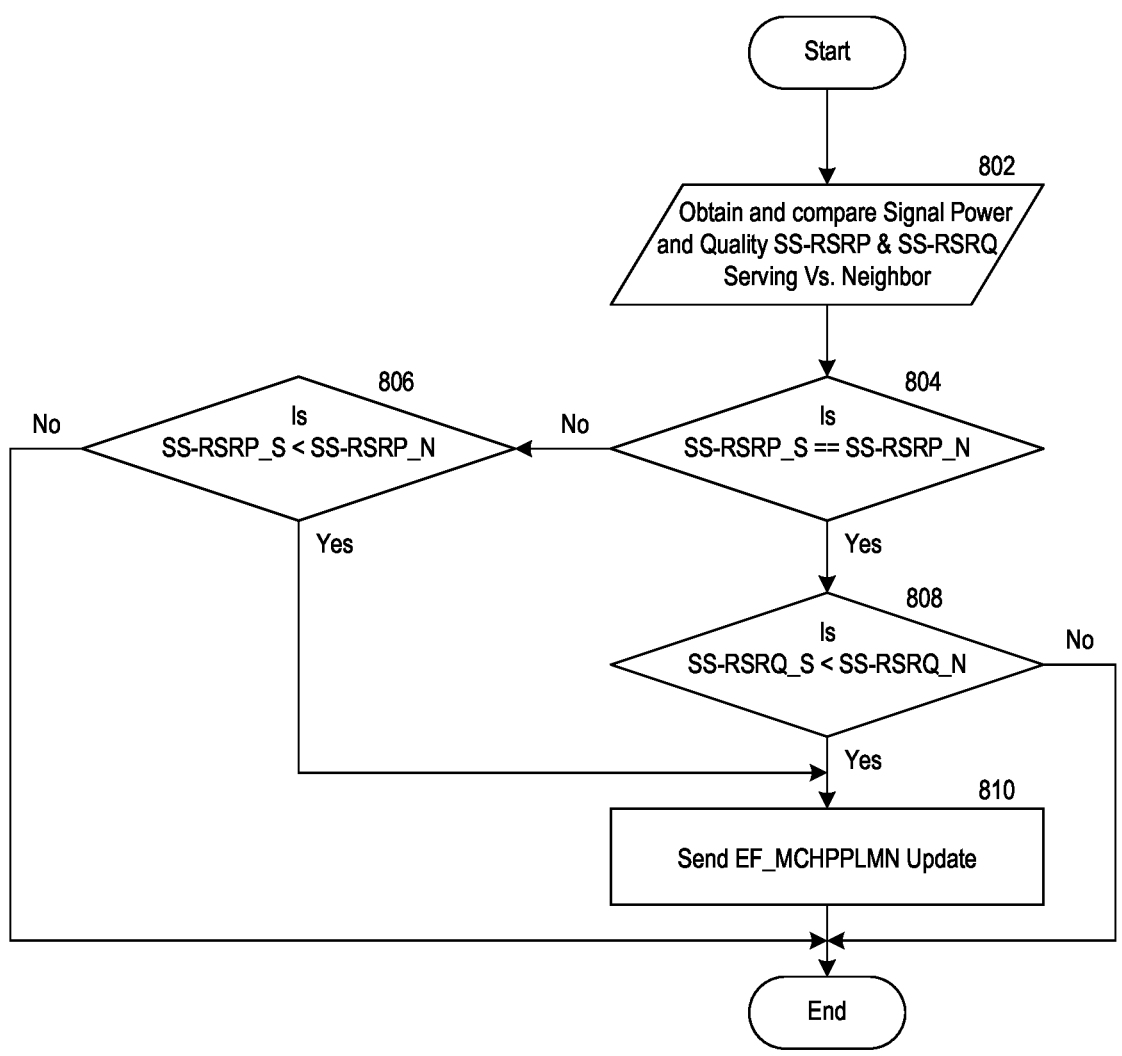
FIG. 8 is a flowchart illustrating example logic that can be implemented in a SIM applet or a SIM applet server in accordance with one or more embodiments of the present technology.

FIG. 8 is a flowchart illustrating example logic that can be implemented in a SIM applet or a SIM applet server in accordance with one or more embodiments of the present technology. FIG. 8 starts with an event. Events can be triggered upon the network conditions (e.g., of the serving cell and/or one or more neighboring cells) satisfying a criterion in relation to a threshold (e.g., the serving cell becomes better or worse than a threshold). For example, an event can be triggered when the network conditions of a serving cell become better or worse than a first threshold and/or the network conditions of a neighbor cell become better or worse than a second threshold. The criteria can be associated with inter-Radio Access Technology (RAT), Channel State Information Reference Signal (CSI-RS) resources, a channel busy ratio, and/or the aerial height of the mobile device.

At operation 802, the network server (e.g., network server 702 as shown in FIG. 7) obtains and compares quality metrics (e.g., SS-RSRP and SS-RSRQ) for both the serving cell and the neighbor cell. The network server checks, at operation 804, whether a first quality metric for both the serving cell and the neighbor cell are equivalent. For example, the system checks RSRP first and determines that the SS-RSRP for the serving cell is equal to the SS-RSRP for the neighbor cell.

If the SS-RSRP for the serving cell is equal to the neighbor cell, then the process proceeds to operation 808. At operation 808, the network server can check a second quality metric (e.g., RSRQ). For example, the system can check RSRQ second and determine that the SS-RSRQ for the serving cell is less than the SS-RSRQ for the neighbor cell. In the event that the second quality metric for the serving cell is less than the second quality metric for the neighbor cell, the process progresses to operation 810 and transmits an indication to the wireless mobile device to adjust an interval of time between two searches for an access network (e.g., sending an $EF_{MCHPPLMN}$ update).

If the first quality metrics are determined by the network server to be not equal, the process progresses to operation 806. At operation 806, the system checks whether the first quality metric for the serving cell is less than the first quality metric for the neighbor cell. if the first quality metric for the serving cell is not less than the first quality metric for the neighbor cell, the process ends. If the first quality metric for the serving cell is less than the first quality metric for the neighbor cell, the process progresses to operation 810. Finally, at operation 808, If the second quality metric for the serving cell is not less than the second quality metric for the neighbor cell, the process then ends.

Additional embodiments and techniques are as described in the following examples.

1. A method for wireless communication, comprising: performing, by a wireless mobile device, measurements of a serving cell and one or more neighboring cells based on a configuration from a base station; comparing, by the wireless mobile device, a first measurement result associated with a first channel condition of the serving cell and a second measurement result associated with a second channel condition of the one or more neighboring cells; and selectively adjusting an interval of time between two searches for an access network according to the comparing of the first measurement result and the second measurement result.

2. The method of example 1, wherein the selectively adjusting comprises: selectively updating, by the wireless mobile device, a multiplier coefficient associated with a Public Land Mobile Network (PLMN) search.

3. The method of example 2, wherein the multiplier coefficient is denoted as EFMCHPPLMN.

4. The method of example 2, wherein the multiplier coefficient is accessible when at least one of a plurality of services on a Subscriber Identity Module (SIM) card is enabled, and wherein the at least one of the plurality of services on the SIM card represents one or more variables.

5. The method of example 1, wherein the selectively adjusting comprises: prioritizing a terrestrial access network based on the measurements of the serving cell and the one or more neighboring cells.

6. The method of example 1, further comprising: comparing, upon determining that the first measurement result is equal to or lower than the second measurement result, a third measurement result associated with the first channel condition of the serving cell and a fourth measurement result associated with the second channel condition of at least one of the one or more neighboring cells.

7. The method of example 1, further comprising increasing the interval of time between the two searches for an access network based on the first measurement result being less than the second measurement result.

8. The method of example 1, further comprising increasing the interval of time between the two searches for the access network based on the first measurement result being greater than or equal to the second measurement result.

9. A device for wireless communication, comprising at least one processor and a memory, wherein the at least one processor is configured to: perform measurements of a serving cell and one or more neighboring cells based on a configuration from a base station; compare a first measurement result associated with a first channel condition of the serving cell and a second measurement result associated with a second channel condition of the one or more neighboring cells; and selectively adjust an interval of time between two searches for an access network according to the comparing of the first measurement result and the second measurement result.

10. The device of example 9, wherein the at least one processor is configured to selectively adjust the interval of time based on: selectively updating, by the device for wireless communication, a multiplier coefficient associated with a Public Land Mobile Network (PLMN) search.

11. The device of example 10, wherein the multiplier coefficient is modified by updating a Subscriber Identity Module (SIM) applet on the device for wireless communication, wherein the SIM applet is stored in memory and runs on a physical SIM card or an embedded SIM card.

12. The device of example 9, wherein the at least one processor is configured to selectively adjust the interval of time based on: prioritizing a satellite-based access network or a terrestrial access network based on the measurements of the serving cell and the one or more neighboring cells.

13. A non-transitory, computer-readable storage medium comprising instructions recorded thereon that, when executed by at least one processor of a system of a wireless telecommunications network, cause the system to: perform, by a wireless mobile device, measurements of a serving cell and one or more neighboring cells based on a configuration from a base station; compare, by the wireless mobile device, a first measurement result associated with a first channel condition of the serving cell and a second measurement result associated with a second channel condition of the one or more neighboring cells; and selectively adjust an interval of time between two searches for an access network according to the comparing of the first measurement result and the second measurement result.

14. The non-transitory, computer-readable storage medium of example 13, wherein the at least one processor of the system is configured to selectively adjust the interval of time based on: selectively updating a multiplier coefficient associated with a Public Land Mobile Network (PLMN) search.

15. The non-transitory, computer-readable storage medium of example 14, wherein the multiplier coefficient is denoted as EFMCHPPLMN.

16. The non-transitory, computer-readable storage medium of example 14, wherein the multiplier coefficient is accessible when at least one of a plurality of services on a Subscriber Identity Module (SIM) card is enabled, and wherein the at least one of the plurality of services on the SIM card represents one or more variables.

17. The non-transitory, computer-readable storage medium of example 13, wherein the at least one processor of the system is configured to selectively adjust the interval of time based on: prioritizing a satellite-based access network or a terrestrial access network based on the measurements of the serving cell and the one or more neighboring cells.

18. The non-transitory, computer-readable storage medium of example 13, further comprising: comparing, upon determining that the first measurement result is equal to or lower than the second measurement result, a third measurement result associated with the first channel condition of the serving cell and a fourth measurement result associated with the second channel condition of at least one of the one or more neighboring cells.

19. The non-transitory, computer-readable storage medium of example 13, further comprising increasing the interval of time between the two searches for the access network based on the first measurement result being less than the second measurement result.

20. The non-transitory, computer-readable storage medium of example 13, further comprising increasing the interval of time between the two searches for the access network based on the first measurement result being greater than or equal to the second measurement result.

21. A method for wireless communication, comprising: receiving, by a network server from a wireless mobile device, measurements of a serving cell and one or more neighboring cells of the wireless mobile device; comparing, by the network server, a first measurement result associated with a first channel condition of the serving cell and a second measurement result associated with a second channel condition of the one or more neighboring cells; and transmitting an indication to the wireless mobile device to adjust an interval of time between two searches for an access network according to the comparing of the first measurement result and the second measurement result.

22. The method of example 21, further comprising: receiving, by the network server, a notification from the wireless mobile device, wherein the notification indicates the first measurement result and the second measurement result.

23. The method of example 21, wherein the network server comprises a Subscriber Identity Module (SIM) applet platform in communication with the wireless mobile device to receive the measurements.

24. The method of example 21, wherein the network server further comprises a SIM server platform configured to manage a SIM of the wireless mobile device.

25. The method of example 24, further comprising: generating an update using a process model implemented on the SIM applet platform; and transmitting the update to the wireless mobile device by the SIM applet platform.

26. The method of example 25, wherein the update includes a modification to decrease the interval of time between the two searches for the access network based on the first measurement result being less than the second measurement result.

27. The method of example 21, further comprising: comparing, upon determining that the first measurement result is equal to or lower than the second measurement result, a third measurement result received from the wireless mobile device and associated with the first channel condition of the serving cell and a fourth measurement result received from the wireless mobile device and associated with the second channel condition of at least one of the one or more neighboring cells.

28. The method of example 21, wherein the interval of time is adjusted based on a multiplier coefficient associated with a Public Land Mobile Network (PLMN) search.

29. The method of example 28, wherein the multiplier coefficient is denoted as $EF_{MCHPPLMN}$.

30. A device for wireless communication comprising: one or more processors; and a non-transitory, computer-readable storage medium storing instructions that, when executed by the one or more processors, cause the one or more processors to: receive, from a wireless mobile device, measurements of a serving cell and one or more neighboring cells; compare a first measurement result associated with a first channel condition of the serving cell and a second measurement result associated with a second channel condition of the one or more neighboring cells; and transmit an indication to the wireless mobile device to adjust an interval of time between two searches for an access network according to the comparing of the first measurement result and the second measurement result.

31. The device of example 30, further comprising a Subscriber Identity Module (SIM) applet platform in communication with the wireless mobile device to receive the measurements.

32. The device of example 31, wherein the SIM applet platform is configured to generate an update using a process model implemented on the SIM applet platform and transmit the update to the wireless mobile device.

33. The device of example 30, further comprising a SIM server platform configured to manage a SIM of the wireless mobile device.

34. A non-transitory, computer-readable storage medium comprising instructions recorded thereon that, when executed by at least one processor of a system of a wireless telecommunications network, cause the system to: receive, by a network server from a wireless mobile device, measurements of a serving cell and one or more neighboring cells of the wireless mobile device; compare, by the network server, a first measurement result associated with a first channel condition of the serving cell and a second measurement result associated with a second channel condition of the one or more neighboring cells; and transmit an indication to the wireless mobile device to adjust an interval of time between two searches for an access network according to the comparing of the first measurement result and the second measurement result.

35. The non-transitory, computer-readable storage medium of example 34, wherein receiving measurements further comprises: receiving a notification from the wireless mobile device, wherein the notification was generated on the wireless mobile device, and wherein the notification comprises the first measurement result and the second measurement result; and determining the measurements of the serving cell and the one or more neighboring cells of the wireless mobile device using the notification.

36. The non-transitory, computer-readable storage medium of example 34, wherein the network server comprises a first communication platform and a second communication platform, wherein the first communication platform is a Subscriber Identity Module (SIM) applet platform responsible for computations and comprises a process model, and wherein the second communication platform is a SIM server platform.

37. The non-transitory, computer-readable storage medium of example 36, wherein the process model generates an update by comparing, upon determining that the first measurement result is equal to or lower than the second measurement result, a third measurement result received from the wireless mobile device and associated with the first channel condition of the serving cell and a fourth measurement result received from the wireless mobile device and associated with the second channel condition of at least one of the one or more neighboring cells.

38. The non-transitory, computer-readable storage medium of example 34, wherein the network server comprises a first communication platform, and wherein the first communication platform communicates with a second network server.

39. The non-transitory, computer-readable storage medium of example 38, wherein the second network server receives an update from the first communication platform of the network server.

40. The non-transitory, computer-readable storage medium of example 39, wherein the network server can transmit the update from the first communication platform to the wireless mobile device, and wherein the wireless mobile device can download the update from the first communication platform of the network server.

Computer System

Figure 9:
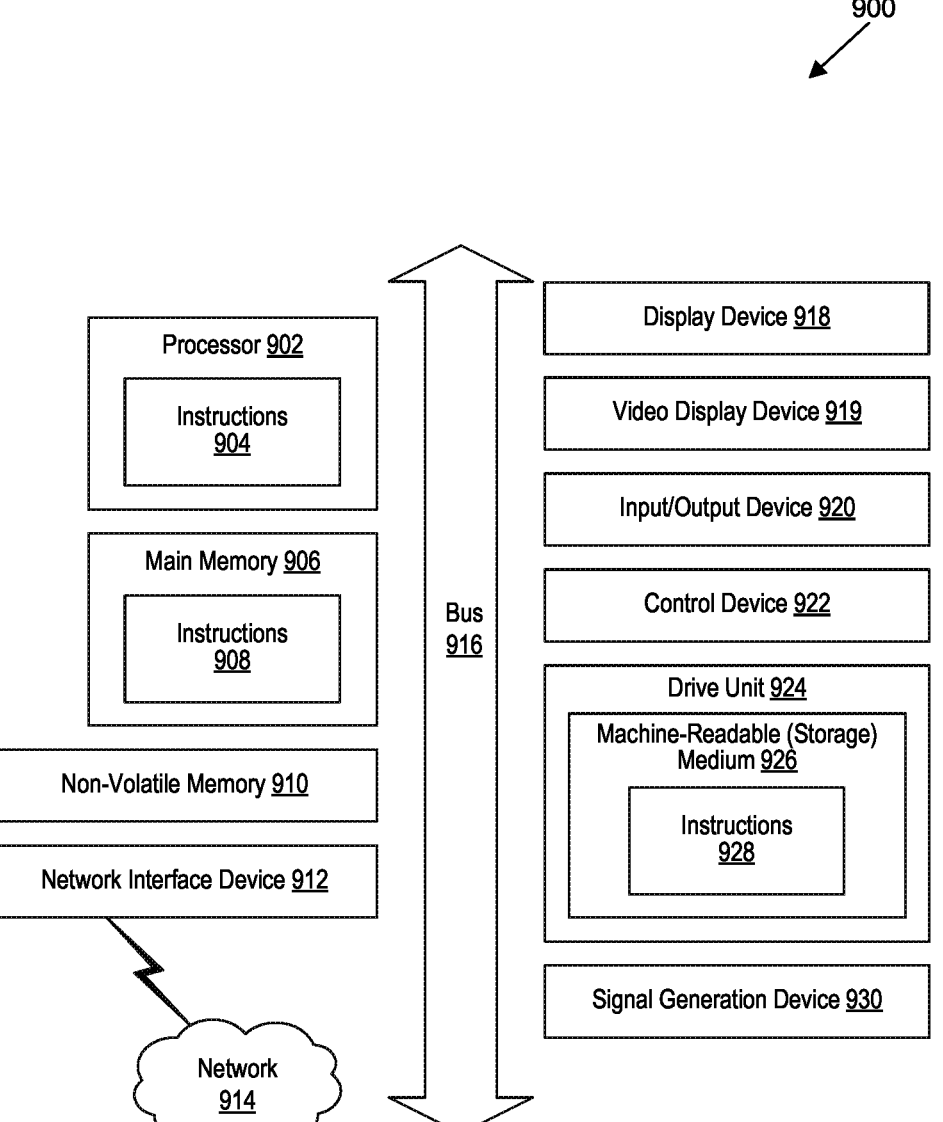
FIG. 9 is a block diagram that illustrates components of a computing device.

FIG. 9 is a block diagram that illustrates an example of a computer system 900 in which at least some operations described herein can be implemented. As shown, the computer system 900 can include: one or more processors 902, main memory 906, non-volatile memory 910, a network interface device 912, a video display device 919, an input/output device 920, a control device 922 (e.g., keyboard and pointing device), a drive unit 924 that includes a storage medium 926, and a signal generation device 930 that are communicatively connected to a bus 916. The bus 916 represents one or more physical buses and/or point-to-point connections that are connected by appropriate bridges, adapters, or controllers. Various common components (e.g., cache memory) are omitted from FIG. 9 for brevity. Instead, the computer system 900 is intended to illustrate a hardware device on which components illustrated or described relative to the examples of the figures and any other components described in this specification can be implemented.

The computer system 900 can take any suitable physical form. For example, the computer system 900 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 900. In some implementations, the computer system 900 can be an embedded computer system, a system-on-chip (SOC), a single-board computer system (SBC), or a distributed system such as a mesh of computer systems, or can include one or more cloud components in one or more networks. Where appropriate, one or more computer systems 900 can perform operations in real time, in near real time, or in batch mode.

The network interface device 912 enables the computer system 900 to mediate data in a network 914 with an entity that is external to the computer system 900 through any communication protocol supported by the computer system 900 and the external entity. Examples of the network interface device 912 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 906, non-volatile memory 910, machine-readable medium 926) can be local, remote, or distributed. Although shown as a single medium, the machine-readable medium 926 can include multiple media (e.g., a centralized/distributed database and/or associated caches and servers) that store one or more sets of instructions 928. The machine-readable (storage) medium 926 can include any medium that is capable of storing, encoding, or carrying a set of instructions for execution by the computer system 900. The machine-readable medium 926 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 910, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 904, 908, 928) set at various times in various memory and storage devices in computing device(s). When read and executed by the processor 902, the instruction(s) cause the computer system 900 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

What is claimed is:

1. A method for wireless communication, comprising:
receiving, by a network server from a wireless mobile device, measurements of a serving cell and one or more neighboring cells of the wireless mobile device,
    wherein receiving the measurements further comprises receiving, by the network server, a notification from the wireless mobile device, and
    wherein the notification indicates a first measurement result associated with a first channel condition of the serving cell and a second measurement result associated with a second channel condition of the one or more neighboring cells;
comparing, by the network server, the first measurement result and the second measurement result; and
transmitting an indication to the wireless mobile device to adjust an interval of time between two searches for an access network according to the comparing of the first measurement result and the second measurement result.

2. The method of claim 1, wherein the network server comprises a Subscriber Identity Module (SIM) applet platform in communication with the wireless mobile device to receive the measurements.

3. The method of claim 1, wherein the network server further comprises a SIM server platform configured to manage a SIM of the wireless mobile device.

4. The method of claim 3, further comprising:
generating an update using a process model implemented on a SIM applet platform; and
transmitting the update to the wireless mobile device by the SIM applet platform.

5. The method of claim 4, wherein the update includes a modification to decrease the interval of time between the two searches for the access network based on the first measurement result being less than the second measurement result.

6. The method of claim 1, further comprising:

comparing, upon determining that the first measurement result is equal to or lower than the second measurement result, a third measurement result received from the wireless mobile device and associated with the first channel condition of the serving cell and a fourth measurement result received from the wireless mobile device and associated with the second channel condition of at least one of the one or more neighboring cells.

7. The method of claim 1, wherein the interval of time is adjusted based on a multiplier coefficient associated with a Public Land Mobile Network (PLMN) search.

8. The method of claim 7, wherein the multiplier coefficient is denoted as $EF_{MCHPPLMN}$.

9. A device for wireless communication comprising:

one or more processors;

a Subscriber Identity Module (SIM) applet platform in communication with a wireless mobile device to receive measurements of a serving cell and one or more neighboring cells; and a non-transitory, computer-readable storage medium storing instructions that, when executed by the one or more processors, cause the one or more processors to:

receive, from the wireless mobile device, the measurements;

compare a first measurement result associated with a first channel condition of the serving cell and a second measurement result associated with a second channel condition of the one or more neighboring cells; and transmit an indication to the wireless mobile device to adjust an interval of time between two searches for an access network according to the comparing of the first measurement result and the second measurement result.

10. The device of claim 9, wherein the SIM applet platform is configured to generate an update using a process model implemented on the SIM applet platform and transmit the update to the wireless mobile device.

11. The device of claim 9, further comprising a SIM server platform configured to manage a SIM of the wireless mobile device.

12. A non-transitory, computer-readable storage medium comprising instructions recorded thereon that, when executed by at least one processor of a system of a wireless telecommunications network, cause the system to:

receive, by a network server from a wireless mobile device, measurements of a serving cell and one or more neighboring cells of the wireless mobile device, wherein receiving measurements further comprises:

receiving a notification from the wireless mobile device, wherein the notification was generated on the wireless mobile device, and wherein the notification comprises the first measurement result and the second measurement result; and determining the measurements of the serving cell and the one or more neighboring cells of the wireless mobile device using the notification;

compare, by the network server, a first measurement result associated with a first channel condition of the serving cell and a second measurement result associated with a second channel condition of the one or more neighboring cells; and transmit an indication to the wireless mobile device to adjust an interval of time between two searches for an access network according to the comparing of the first measurement result and the second measurement result.

13. The non-transitory, computer-readable storage medium of claim 12, wherein the network server comprises a first communication platform and a second communication platform, wherein the first communication platform is a Subscriber Identity Module (SIM) applet platform responsible for computations and comprises a process model, and wherein the second communication platform is a SIM server platform.

14. The non-transitory, computer-readable storage medium of claim 13, wherein the process model generates an update by comparing, upon determining that the first measurement result is equal to or lower than the second measurement result, a third measurement result received from the wireless mobile device and associated with the first channel condition of the serving cell and a fourth measurement result received from the wireless mobile device and associated with the second channel condition of at least one of the one or more neighboring cells.

15. The non-transitory, computer-readable storage medium of claim 12, wherein the network server comprises a first communication platform, and wherein the first communication platform communicates with a second network server.

16. The non-transitory, computer-readable storage medium of claim 15, wherein the second network server receives an update from the first communication platform of the network server.

17. The non-transitory, computer-readable storage medium of claim 16, wherein the network server can transmit the update from the first communication platform to the wireless mobile device, and wherein the wireless mobile device can download the update from the first communication platform of the network server.

18. The device of claim 10, wherein the update includes a modification to decrease the interval of time between the two searches for the access network based on the first measurement result being less than the second measurement result.

19. The device of claim 9, wherein the interval of time is adjusted based on a multiplier coefficient associated with a Public Land Mobile Network (PLMN) search.

20. The device of claim 19, wherein the multiplier coefficient is denoted as $EF_{MCHPPLMN}$.

* * * * *